March 18, 1924.

W. M. BALDWIN 1,486,851

SAW FILING MACHINE

Filed Dec. 2, 1922 4 Sheets-Sheet 1

W. M. Baldwin, INVENTOR

BY Victor J. Evans ATTORNEY

WITNESS:

March 18, 1924.  W. M. BALDWIN  1,486,851
SAW FILING MACHINE
Filed Dec. 2, 1922   4 Sheets-Sheet 2
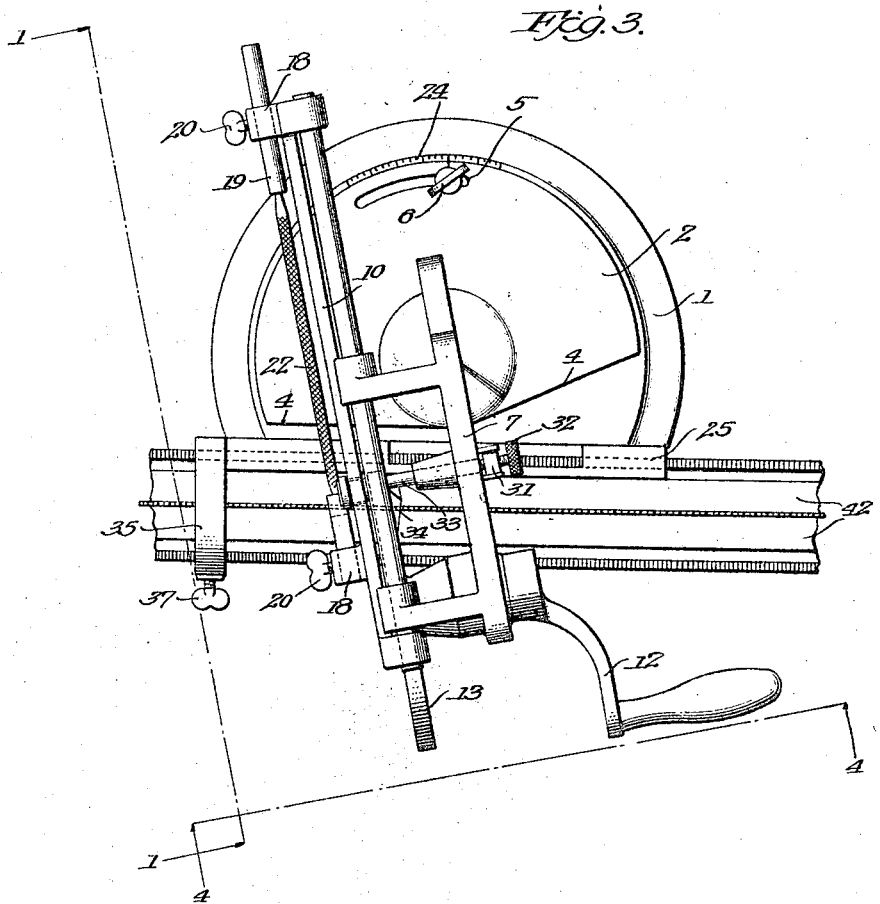
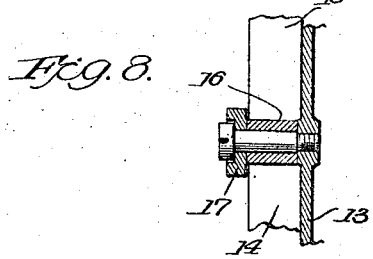

March 18, 1924.

W. M. BALDWIN

SAW FILING MACHINE

Filed Dec. 2, 1922

W. M. BALDWIN 1,486,851

SAW FILING MACHINE

Filed Dec. 2, 1922     4 Sheets-Sheet 4

W. M. Baldwin
INVENTOR

BY Victor J. Evans
ATTORNEY

WITNESS:

Patented Mar. 18, 1924.

1,486,851

UNITED STATES PATENT OFFICE.

WILBERT M. BALDWIN, OF MASON, MICHIGAN.

SAW-FILING MACHINE.

Application filed December 2, 1922. Serial No. 604,551.

*To all whom it may concern:*

Be it known that I, WILBERT M. BALDWIN, a citizen of the United States, residing at Mason, in the county of Ingham and State of Michigan, have invented new and useful Improvements in Saw-Filing Machines, of which the following is a specification.

This invention relates to a saw filing machine, the general object of the invention being to provide a hand operated device for easily and quickly filing saws.

Another object of the invention is to make the parts adjustable so that saws of different sizes can be placed in the same.

A further object of the invention is to provide means for adjusting the file to give the desired "hook" to the saw teeth and also to provide means whereby different sized files can be used with the device.

A still further object of the invention is to provide means whereby the desired bevel can be given to the saw teeth.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a plan view.

Figure 1:
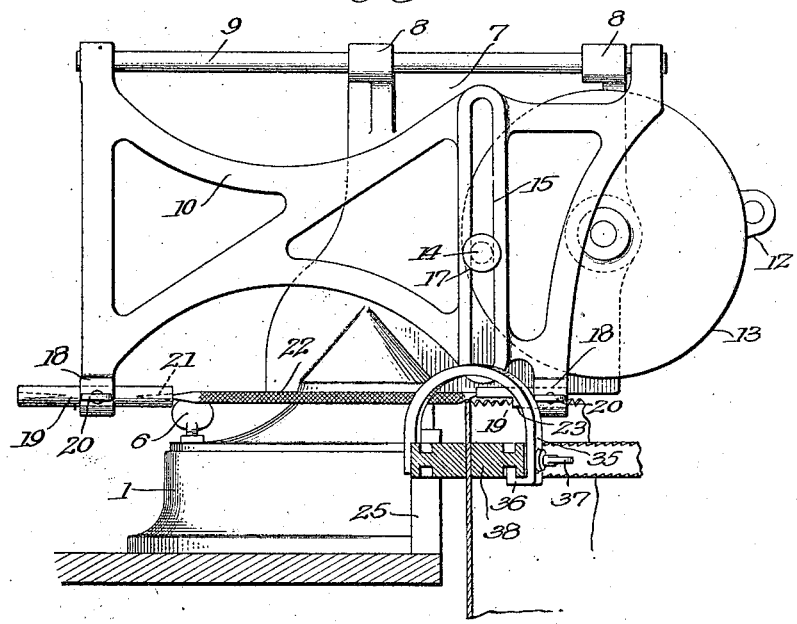
Figure 1 is a view of one side of the device.
Figure 2:
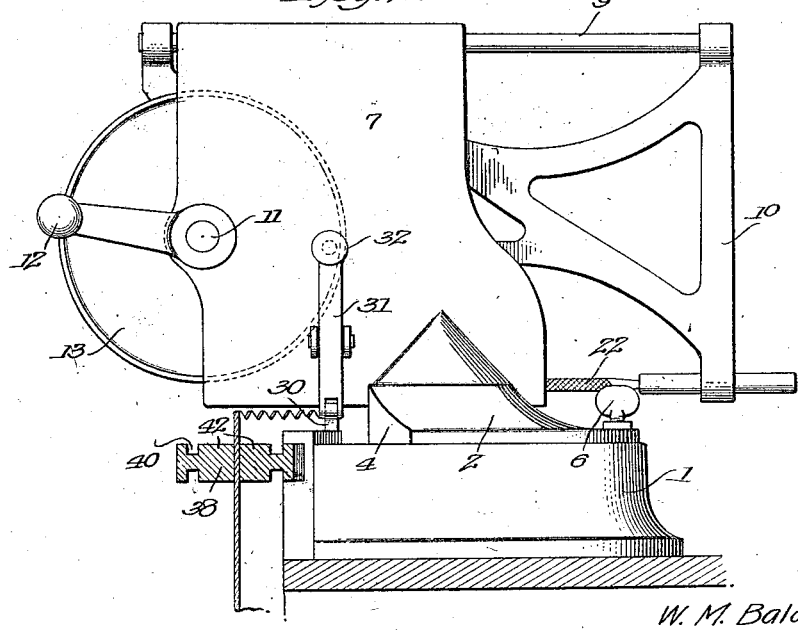
Figure 2 is a view of the opposite side.
Figure 4:
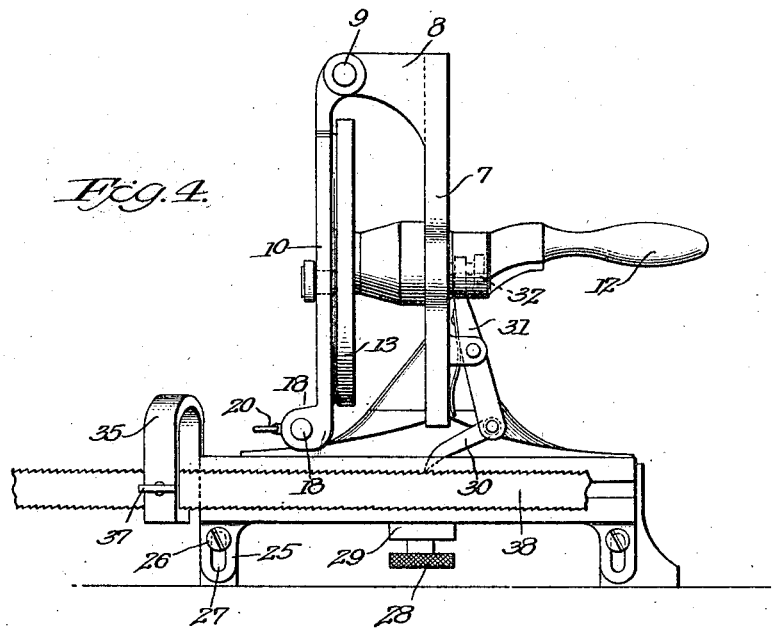
Figure 4 is a section on line 4—4 of Figure 3.
Figure 9:
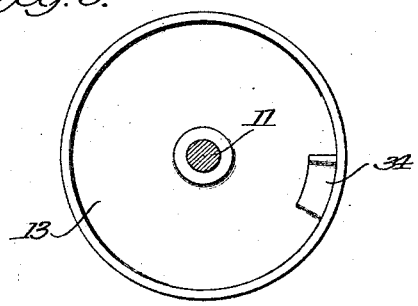
Figure 5:
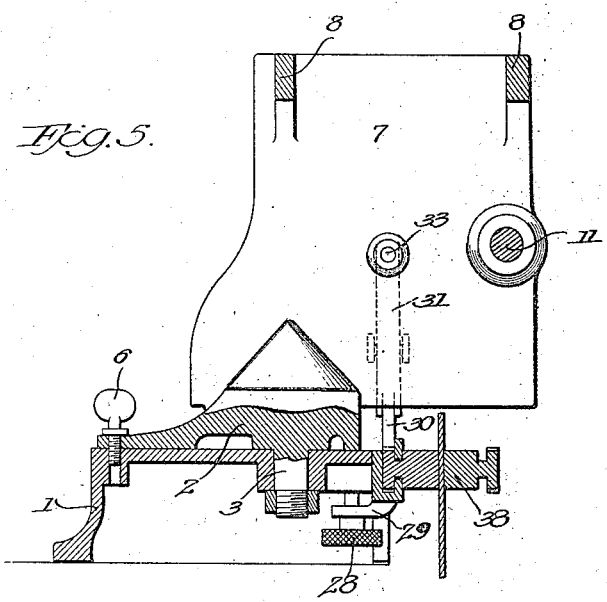
Figure 5 is a section on line 5—5 of Figure 3.
Figure 6:
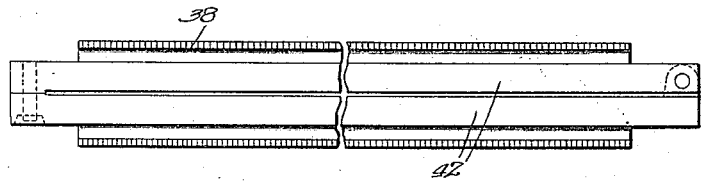
Figure 6 is a horizontal section on line 6—6 of Figure 4.
Figure 7:
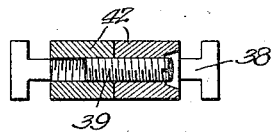

The remaining Figures 7, 8, and 9 are detail views.

In these views 1 indicates a base which is adapted to be fastened to a bench or other support. This base has one flat side to permit the saw to be positioned. A table 2 is rotatably mounted on the base by having the pivot pin 3 passing through the center of the bottom of the base and table. This table is of substantially semi-circular shape with two flat edges 4 which are arranged at an angle to each other. A curved slot 5 is formed in the table and a set screw 6 passes through this slot into the base for holding the table in adjusted position on the base. An upright frame 7 is connected with the table and said frame carries a pair of brackets 8 at its upper end having eyes therein through which passes a rod 9 which is secured to a plate 10. The frame has rotatably mounted thereon a shaft 11 to one end of which is connected a handle 12 and to the other end of which is connected a disc 13 which has a crank pin 14 thereon which passes through a vertical slot 15 in the plate 10, the pin being provided with a roller 16 for engaging the walls of the slot and a collar 17 for holding the pin in the slot. Thus by rotating the disc by means of its handle the pin engaging the walls of the slot will cause the plate to be reciprocated, the rod 9 sliding in the eyes of the brackets. Perforated ears 18 are located at the lower ends of the plate and file holders 19 pass through the perforations in the ears and are held therein by the set screws 20. The inner ends of the holders are provided with sockets 21 to receive the ends of a file such as shown at 22, the sockets being so formed that files of different sizes can be held by the holders. The set screws permit the holders to be adjusted and tilted to suit different lengths of files and also to give the desired "hook" to the saw teeth. The front holder is notched, as at 23, to allow the saw to pass when the file carrier is at its rear limit of movement. By adjusting the table on the base the file can be set to give the desired bevel to the teeth of the saw and I may provide graduations 24 to facilitate the adjustment of the table. A guide bar 25 is adjustably secured to the flat edge of the base 1 by means of screws 26 passing through the slots 27 in said bar. A set screw 28 passing through a bracket 29 on the bar acts to adjust the bar vertically so that the saw can be given a second filing when necessary. A feed finger 30 projects into the guideway of the guide bar and this finger is pivoted to the lower end of a spring pressed rocker bar 31 which is pivoted to the frame midways its ends and which has a turn screw 32 at its upper end which passes through a hole in the frame and which is engaged by a plunger 33 carried by the frame and which is held by the spring of the rocker bar against the inner face of the disc, said disc having a cam 34 thereon for engaging the plunger for forcing the same outwardly so as to rock the bar 31 and move the tooth forwardly to feed the saw holder, hereinafter to be described, so as to bring a new tooth under the file. A curved support 35 is connected with the front end of the guide bar, the free end of said support having a guideway 36 therein and a set screw 37 passes through the support immediately above the guide way. The saw clamp 38 consists of two bars hingedly connected together at one end and connected together at their other ends by the set screw 39. The outer edges of these bars are provided with guideways 40 for engaging the guideway in the bar 25 and with the teeth 41 for engagement by the feed finger 30. The teeth are formed varying distances apart so that by placing the proper row of teeth uppermost and in the guideway the clamp will be moved a certain distance by the feed finger to bring the teeth of the saw under the file. As will be seen the guideway 40 at one edge of the clamp will engage the guideway in the bar 25 while the other guideway will engage the guideway 36 in the support 35. The set screw 37 will act as a brace for the saw clamp and the saw therein to hold the saw while the file is acting upon the same. It also acts to place tension on the clamp to keep the file from pushing the saw forwardly during the filing action.

The bars 42 forming the clamp are slightly sprung at their centers and they are stamped with the number of teeth on each edge thereof.

As will be understood after the saw is placed in the clamp the clamp is run through the guideways in the bar and support until the first tooth comes under the file. The parts are properly adjusted to give the desired set to the file and then by turning the handle the disc will be revolved to reciprocate the file and after the file has returned to its starting point the cam will cause the tooth to operate to feed the clamp and saw forward to bring a new saw tooth into position. Thus a saw can be easily and quickly sharpened by hand. The device eliminates jointing the saw as every tooth is filed even and alike. A file can be used longer in this machine than when used by hand.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A saw filing machine comprising a base, guideways connected therewith, a saw holder mounted to slide in said guideways, a frame adjustably mounted on the base, a reciprocating file holder carried by the frame, said holder having a slot therein, a disc mounted to rotate in the frame and having a crank pin engaging the slot, a handle for rotating the disc, feed means for the saw holder and a cam on the disc for actuating such means.

2. A saw filing machine comprising a base, guideways connected therewith, a saw holder mounted to slide in said guideways, a frame adjustably mounted on the base, a reciprocating file holder carried by the frame, said holder having a slot therein, a disc mounted to rotate in the frame and having a crank pin engaging the slot, a handle for rotating the disc, feed means for the saw holder, a cam on the disc for actuating such means, such means consisting of a tooth for engaging the saw holder, a rocker bar pivoted on the frame and to which the tooth is pivoted, a plunger actuated by the disc and an adjustable member carried by the rocker bar for engaging the plunger.

3. A saw filing machine comprising a base, a saw holder slidably mounted on the base, a frame adjustably mounted on the base, a reciprocating plate carried by the frame, manually operated means for reciprocating the plate and for moving the saw holder step by step, file holders slidably and rotatably mounted in the plate and each holder having an eccentrically arranged file receiving socket therein and a set screw for holding each holder in adjusted position.

4. A saw filing machine comprising a base, a bar adjustably mounted on the base and having a guideway therein, a curved support connected with one end of the bar and having a guideway in its free end, a set screw carried by the support adjacent the guideway, a saw holder engaging the guideways and adapted to be engaged by the set screw, a frame mounted on the base, a reciprocating file holder on the frame and manually operated means for reciprocating the file holder and giving the saw holder a step by step movement.

In testimony whereof I affix my signature.

WILBERT M. BALDWIN.